(12) United States Patent  
Nagahashi et al.

(10) Patent No.: US 7,519,618 B2
(45) Date of Patent: Apr. 14, 2009

(54) METADATA GENERATING APPARATUS

(75) Inventors: Toshinori Nagahashi, Tatsuno (JP); Takashi Hyuga, Suwa (JP)

(73) Assignee: Seiko Epson Corporation (JP)

( * ) Notice: Subject to any disclaimer, the term of this patent is extended or adjusted under 35 U.S.C. 154(b) by 324 days.

(21) Appl. No.: 11/294,719

(22) Filed: Dec. 6, 2005

(65) Prior Publication Data

US 2006/0235869 A1 Oct. 19, 2006

(30) Foreign Application Priority Data

Dec. 8, 2004 (JP) .............................. 2004-354991

(51) Int. Cl.
*G06F 17/30* (2006.01)
*G06F 15/16* (2006.01)

(52) U.S. Cl. .............. 707/104.1; 348/231.2; 348/231.3; 348/231.4; 707/1; 707/100

(58) Field of Classification Search .............. 348/231.2, 348/3, 4; 707/704, 104.1, 1, 100
See application file for complete search history.

(56) References Cited

U.S. PATENT DOCUMENTS 6,408,301 B1 * 6/2002 Patton et al. ................. 707/102
6,833,865 B1 * 12/2004 Fuller et al. ............... 348/231.2
6,877,134 B1 * 4/2005 Fuller et al. ............... 715/500.1
2002/0044690 A1 * 4/2002 Burgess ....................... 382/209
2003/0177503 A1 * 9/2003 Sull et al. .................... 725/112
2003/0195863 A1 * 10/2003 Marsh ............................ 707/1
2004/0260725 A1 * 12/2004 Ohnuma ................... 707/104.1
2005/0033758 A1 * 2/2005 Baxter ......................... 707/100
2006/0242152 A1 * 10/2006 Tanaka et al. ................ 707/10

FOREIGN PATENT DOCUMENTS

JP 2001292413 A * 10/2001
JP 2003-303210 10/2003

* cited by examiner

*Primary Examiner*—Tony Mahmoudi
*Assistant Examiner*—Dennis Truong
(74) *Attorney, Agent, or Firm*—Harness, Dickey & Pierce, P.L.C.

(57) ABSTRACT

A metadata generating apparatus includes: a private-content-information creating unit that creates content information of an individual; a public-content-information collecting unit that collects public content information for which metadata for retrieval is created; a keyword extracting unit that extracts a keyword, which forms a basis of the metadata for retrieval, from the public content information collected by the public-content-information collecting unit; and a metadata generating unit that generates metadata for retrieval for a private content, which is created by the private-content-information creating unit, on the basis of the keyword extracted by the keyword extracting unit.

7 Claims, 11 Drawing Sheets

```
<Title> FIREWORK DISPLAY IN 2004 </Title>
<Synopsis>
  IN FIREWORK DISPLAY, LARGE FIREWORKS WERE
  SET OFF ON SUMIDA RIVER.
  SPECTATORS CHEERED.
</Synopsis>
```

FIG. 8

FIREWORK DISPLAY, ATHLETIC MEET, EXHIBITION, CONCERT......
TONE RIVER, SUMIDA RIVER, KISO RIVER......

FIG. 9

```
<Derivedkeyword>
  FIREWORK DISPLAY
</Derivedkeyword>
```

FIG. 10

METADATA GENERATING APPARATUS

BACKGROUND

1. Technical Field

The present invention relates to a metadata generating apparatus that can easily generate metadata of a private content constituted by still image data, moving image data, and the like produced by an individual.

2. Related Art

According to spread of a digital camera and a cellular phone with a camera in recent years, it is becoming extremely easy to photograph a large quantity of videos and images and store photographed image data in a storage such as a personal computer or a storage medium such as a compact disk or a digital video disk as private contents in addition to public contents made public on television programs broadcasted or web pages. It is essential to add metadata to the private contents including the large quantity of videos and images in order to retrieve the private contents efficiently.

A photographing date and time is automatically stored in an image or a video photographed by a digital camera or a digital video camera as metadata. However, the metadata is insufficient in term of efficient retrieval. Moreover, systems for creating metadata such as Dublin Core and MPEG-7 have been established. However, work for creating and inputting metadata on the basis of the systems requires skill. Thus, it is difficult for general users, who are not specialists, to create metadata.

Therefore, there has been proposed an information processing method in an image processing apparatus including an event storing unit that is capable of storing plural pieces of event information including at least information on time and an information storing unit that is capable of storing object data having additional information including at least information on time. An even information relation judging unit judges whether an event and the object data are related on the basis of the event information and the additional information. Information representing the object data is displayed such that a result of the judgment is recognizable in an event display unit. (See, for example, JP-A-2003-303210 (Claim 1 and FIGS. 1 and 13.)

However, the example described in JP-A-2003-303210 has an unsolved problem in that it is necessary to prepare event information such as schedule data and a date and time of the event information has to be maintained with high reliability, causing troubles for a user. There is also an unsolved problem in that it is impossible to retrieve a private content when event information is not prepared.

SUMMARY

An advantage of some aspects of the invention is to provide a metadata generating apparatus that can generate metadata that has a high degree of appropriateness to a private content and with which the private content can be retrieved easily.

A metadata generating apparatus according to a first aspect of the invention includes: private-content-information creating means that creates content information of an individual; public-content-information collecting means that collects public content information for which metadata for retrieval is created; keyword extracting means that extracts a keyword, which forms a basis of the metadata for retrieval, from the public content information collected by the public-content-information collecting means; and metadata generating means that generates metadata for retrieval for a private content, which is created by the private-content-information creating means, on the basis of the keyword extracted by the keyword extracting means.

In the metadata generating apparatus according to the first aspect of the invention, the private-content-information creating means creates private content information that includes still image data and moving image data of a digital camera, a digital video camera, or the like. On the other hand, the public-content-information collecting means collects public content information including arbitrary event information such as a television program or a radio program broadcasted through a broadcasting radio wave, a CATV, the Internet, or the like or a video provided by video-on-demand. The keyword extracting means extracts a keyword from the public content information collected. The metadata generating means generates metadata for retrieval on the basis of the keyword extracted. This makes it easy to automatically generate the metadata for retrieval with which retrieval with respect to the private content information is facilitated.

According to a second aspect of the invention, in the metadata generating apparatus in the first aspect of the invention, the public-content-information collecting means collects public content information including metadata. The keyword extracting means includes: metadata analyzing means that analyzes metadata included in the public content information collected by the public-content-information collecting means; and morphological analysis means that subjects the public content information to morphological analysis on the basis of a result of the analysis of the metadata analyzing means to extract a keyword.

In the second aspect of the invention, the metadata analyzing means analyzes the metadata included in the collected public content information and the morphological analysis means subjects the public content information to morphological analysis on the basis of a result of the analysis to extract a keyword. This makes it possible to extract a keyword for private content information.

According to a third aspect of the invention, in the metadata generating apparatus in the first aspect of the invention, the public-content-information collecting means collects public content information including sound information. The keyword extracting means includes: sound recognizing means that subjects the sound information to sound recognition to form text data; and morphological analysis means that subjects the text data formed by the sound recognizing means to morphological analysis to extract a keyword.

In the third aspect of the invention, the public-content-information collecting means collects public content information including sound information, the sound recognizing means subjects the sound information to sound recognition to form text data, and the morphological analysis means subjects the text data to morphological analysis to extract a keyword. This makes it possible to extract a keyword from the sound information accurately.

According to a fourth aspect of the invention, in the metadata generation apparatus in the first aspect of the invention, the keyword extracting means has keyword storing means that stores a keyword for which metadata for retrieval is generated. The keyword extracting means selects a keyword, which coincides with the keyword stored in the keyword storing means, among keywords extracted from the public content information as an object keyword.

In the fourth aspect of the invention, a keyword, which coincides with a keyword stored in the keyword storing means, among keywords extracted from the public content information is selected as an object keyword. This make it possible to extract a keyword optimum for thought of a user by storing a keyword according to thought of the user in the keyword storing means.

According to a fifth aspect of the invention, in the metadata generating apparatus in the fourth aspect of the invention, the keyword storing means stores the keyword extracted from the public content information.

In the fifth aspect of the invention, it is possible to store the keyword extracted from the public content information in the keyword storing means according to preference of the user and store a keyword optimum for thought of the user.

According to a sixth aspect of the invention, in the metadata generating apparatus in the first aspect of the invention, the metadata generating means selects a keyword for retrieval on the basis of a predetermined degree of appropriateness from keywords extracted by the keyword extracting means and generates metadata for retrieval on the basis of the keyword for retrieval selected.

In the sixth aspect of the invention, the metadata generating means selects a keyword for retrieval on the basis of a predetermined degree of appropriateness from keyword extracted by the keyword extracting means and generates metadata for retrieval on the basis of the keyword for retrieval selected. Thus, it is possible to prevent metadata for retrieval from being generated on the basis of an unnecessary keyword and generate metadata for retrieval only with a keyword with high accuracy of retrieval.

According to a seventh aspect of the invention, in the metadata generating apparatus in the first aspect of the invention, the metadata generating means sets a high appearance frequency as the predetermined degree of appropriateness and selects a keyword with a high appearance frequency as a keyword for retrieval.

In the seventh aspect of the invention, the metadata generating means selects a keyword with a high appearance frequency as a keyword for retrieval. This makes it possible to generate metadata for retrieval with higher retrieval efficiency for private content information from the keyword.

A metadata generating apparatus according to an eighth aspect of the invention includes: private-content-information creating means that creates content information of an individual; public-content-information collecting means that collects public content information including metadata for which metadata for retrieval is created; keyword input means that inputs a keyword; public-content-information extracting means that extracts public content information including metadata describing a keyword coinciding with the keyword inputted by the keyword input means; and metadata generating means that generates the metadata, which is included in the public content information extracted by the public-content-information collecting means, as metadata for retrieval for private content information.

In the eighth aspect of the invention, when a user inputs a keyword optimum for private content information with the keyword input means, the public-content-information extracting means extracts public content information including metadata describing the keyword inputted. The metadata generating means generates the metadata, which is included in the public content information extracted, as metadata for retrieval for the private content information. This makes it possible to surely generate metadata for retrieval corresponding to the keyword set by the user.

According to a ninth aspect of the invention, in the metadata generating apparatus in the first aspect of the invention, the content information collecting means collects content information included in at least one of a broadcast radio wave, a network, and a storage medium.

In the ninth aspect of the invention, the content information collecting means collects content information included in at least one of a broadcast radio wave, a network, and a storage medium. This makes it possible to collect metadata optimum for private content information in a wide range and generate optimum metadata.

BRIEF DESCRIPTION OF THE DRAWINGS

The invention will be described with reference to the accompanying drawings, wherein like numbers reference like elements.

FIG. 8 is a diagram for explaining metadata added to public content information.

FIG. 9 is a diagram for explaining a keyword storing content stored in a keyword storing unit.

FIG. 10 is a diagram for explaining an example of metadata for retrieval added to private content information;

DESCRIPTION OF EXEMPLARY EMBODIMENTS

Exemplary embodiments of the invention are explained below with reference to the accompanying drawings.

Figure 1:
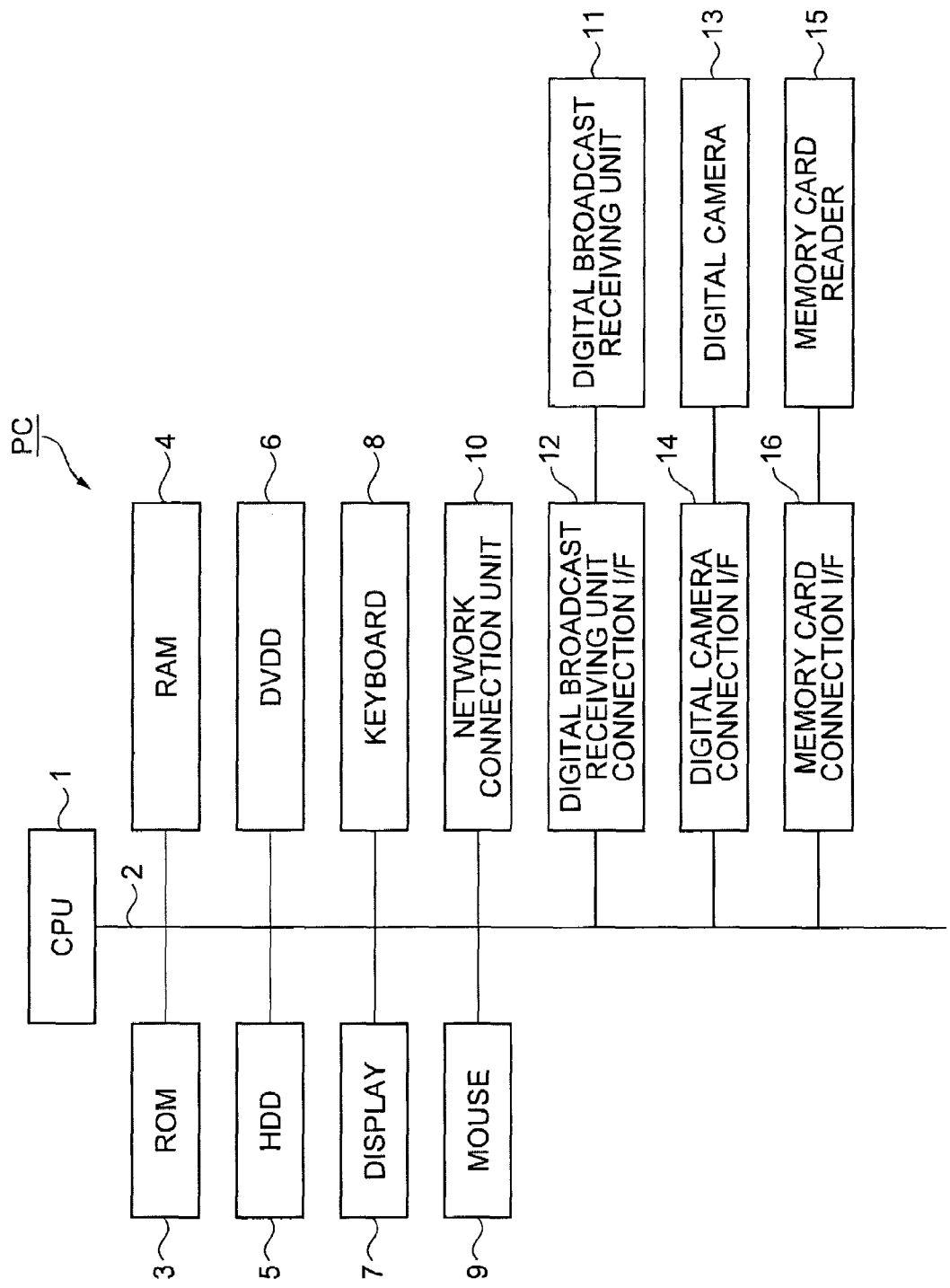
FIG. 1 is a block diagram showing an embodiment of the invention.

FIG. 1 is a block diagram showing a first embodiment of the invention. In the figure, reference sign PC denotes an information processing apparatus constituted by a personal computer, a server, or the like. The information processing apparatus PC includes a central processing unit (CPU) 1. A ROM 3, a RAM 4, a hard disk device (HDD) 5, a DVD drive device (DVDD) 6, a display 7, a keyboard 8 and a mouse 9, and the like are connected to the central processing unit 1. The ROM 3 has stored therein a program executed by the central processing unit 1 via a system bus 2. The RAM 4 stores data and the like necessary for arithmetic processing executed in the central processing unit 1. The hard disk device 5 stores an application program, private and public content information described later, and the like. The DVD drive device 6 writes data in and reads out data from a digital versatile disk (DVD). The display 7 displays data. The keyboard 8 and the mouse 9 are used for inputting data.

A network connection unit 10, a digital-broadcast-receiving-unit connection interface 12, a digital camera connection interface 14, and a memory card interface 16 are connected to a system bus 2. The network connection unit 10 connects the information processing apparatus PC to a network such as the Internet. The digital-broadcast-receiving-unit connection interface 12 connects a digital broadcast receiving unit 11, which receives a digital broadcast radio wave, to the information processing apparatus PC. The digital camera connection interface 14 connects a digital camera 13 serving as the private-content-information creating means to the information processing apparatus PC. The memory card interface 16 connects a memory card reader 15, in which various memory cards are inserted, to the information processing apparatus PC.

Figure 2:
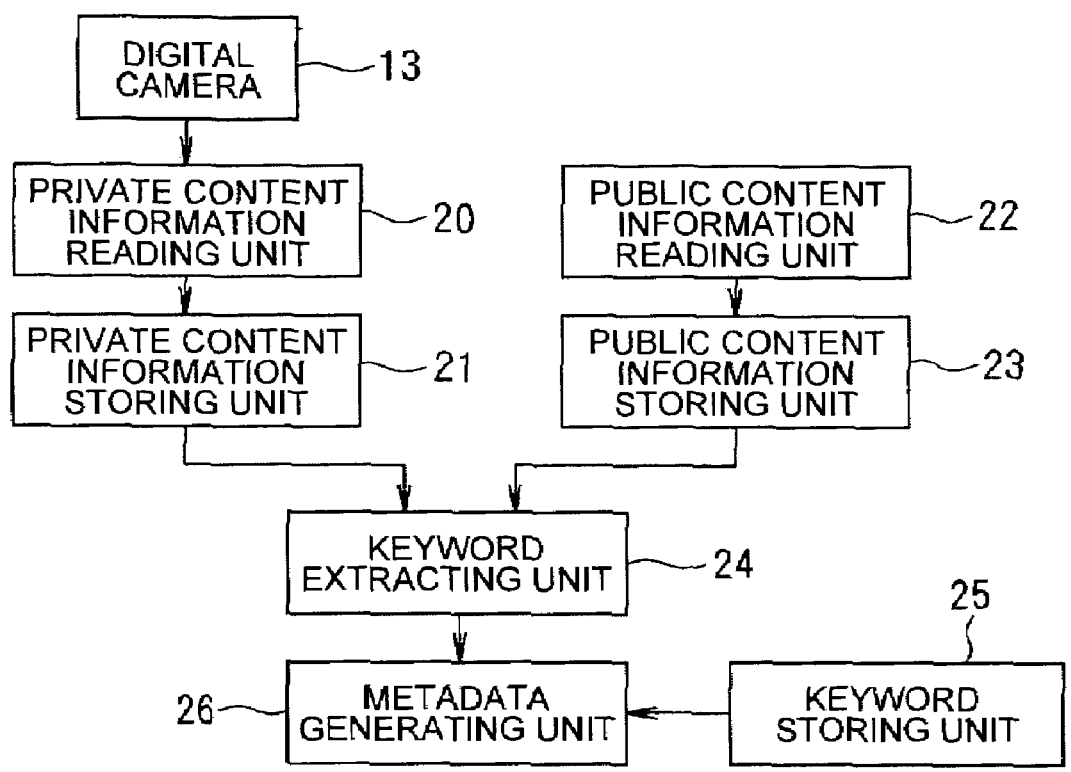
FIG. 2 is a functional block diagram of a central processing-unit.

As shown in a functional block diagram in FIG. 2, the central processing unit 1 includes a private-content-information reading unit 20, a private-content-information storing unit 21, a public-content-information collecting unit 22, a public content information storing unit 23, a keyword extracting unit 24, and metadata generating unit 26. The private-content-information reading unit 20 reads private content information, which includes image data and photographing metadata as described later, from the digital camera 13. The private-content-information storing unit 21 stores the private content information read by the private-content-information reading unit 20. The public-content-information collecting unit 22 collects public content information including metadata serving as public content information that forms a basis for generating metadata for retrieval that, when private content information is retrieved, facilitates the retrieval. The public content information storing unit 23 stores the public content information collected by the public-content-information collecting unit 22. The keyword extracting unit 24 selects private content information, to which metadata for retrieval is added, from the private content information stored in the private-content-information storing unit 21 and extracts a keyword from metadata of public content information corresponding to a photographing date and time of the private content information. The metadata generating unit 26 selects keywords coinciding with keywords conforming to an intention of a user, which are stored in a keyword storing unit 25 in advance, among keywords extracted by the keyword extracting unit 24, adopts a keyword with a high appearance frequency among the keywords selected as a keyword for retrieval, converts the keyword into metadata for retrieval, and stores the metadata for retrieval in association with the private content information.

Figure 3:
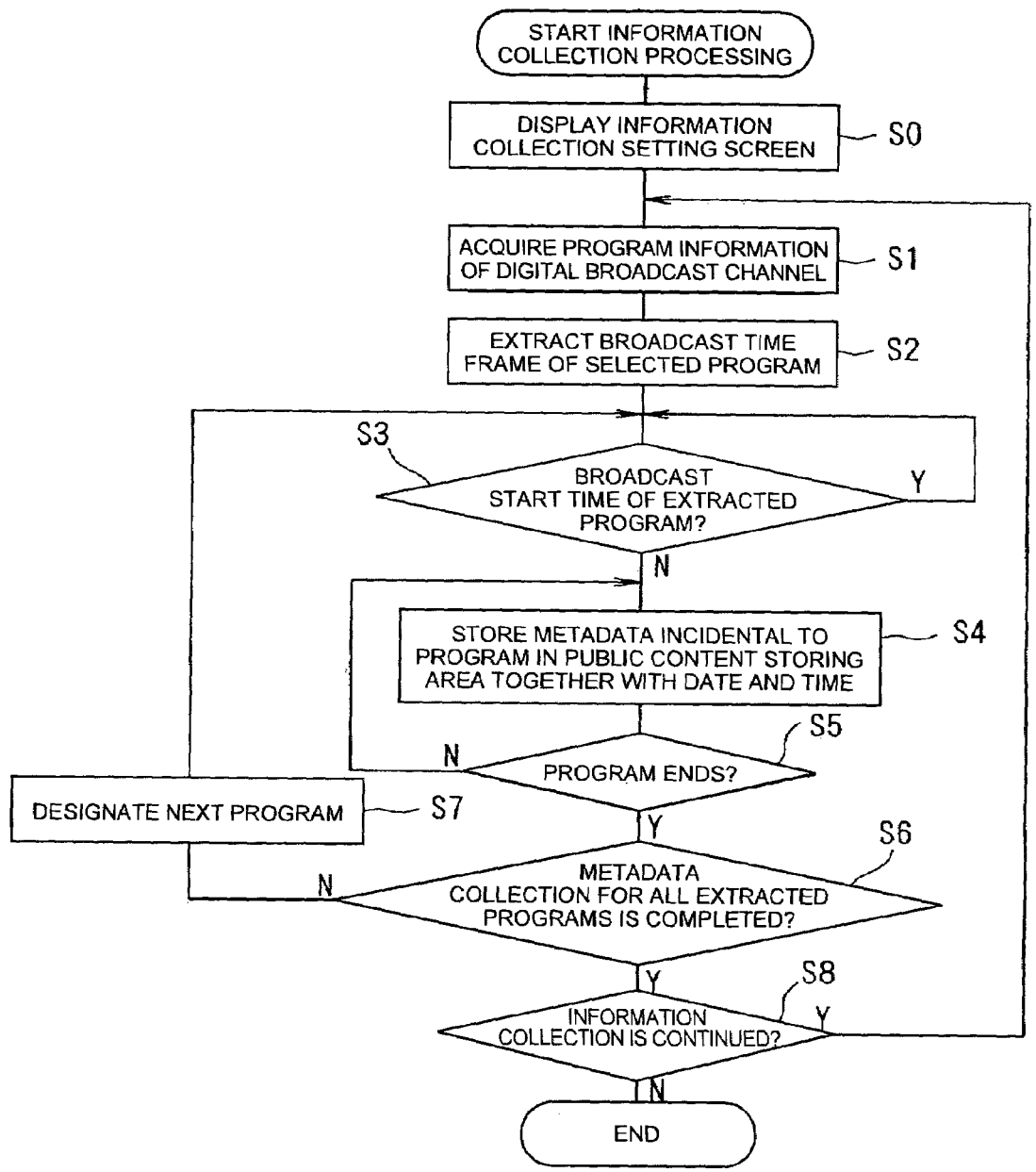
FIG. 3 is a flowchart showing an example of a procedure for public content information collection processing that is executed in the central processing unit.
Figure 5:
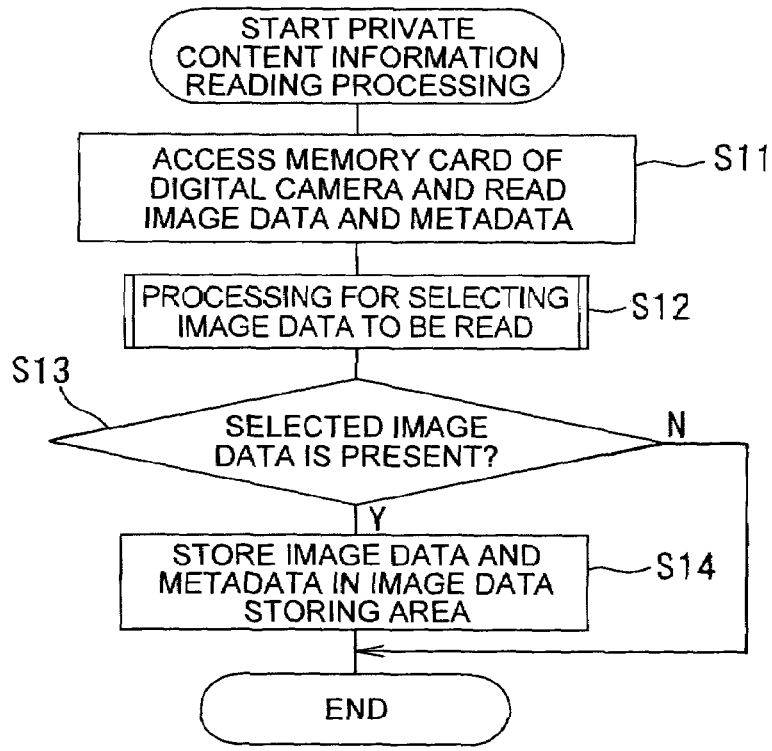
FIG. 5 is a flowchart showing an example of a procedure for private content information reading processing that is executed in the central processing unit.
Figure 7:
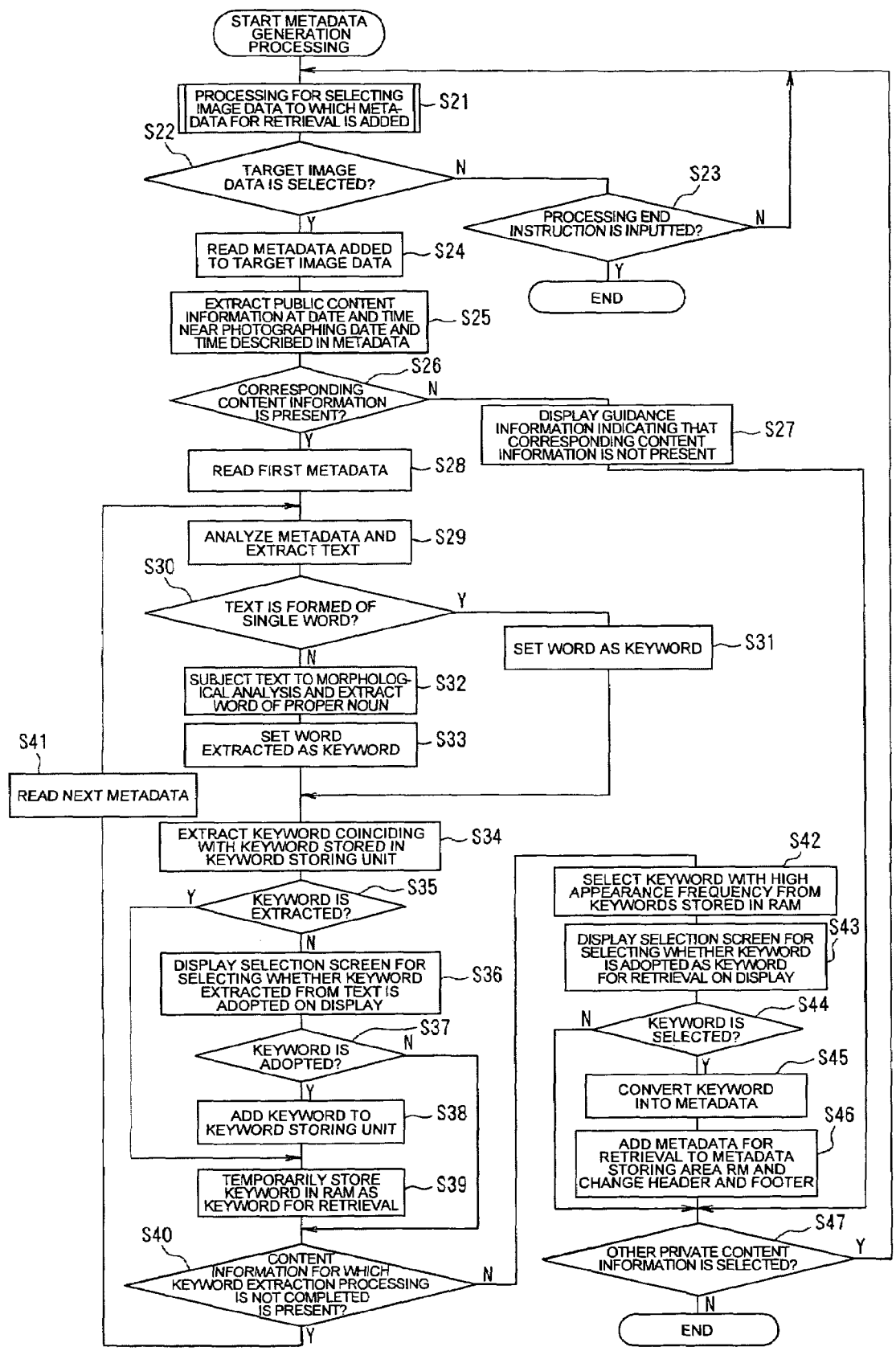
FIG. 7 is a flowchart showing an example of a procedure for metadata generation processing that is executed in the central processing unit.

The central processing unit 1 executes content information collection processing described in FIG. 3 for collecting public content information that forms a basis for generating metadata that, when private content information is retrieved, facilitates the retrieval, private content information reading processing described in FIG. 5 for reading still image data from the digital camera 13, and metadata generation processing described in FIG. 7 for generating metadata from public content information.

Figure 4:
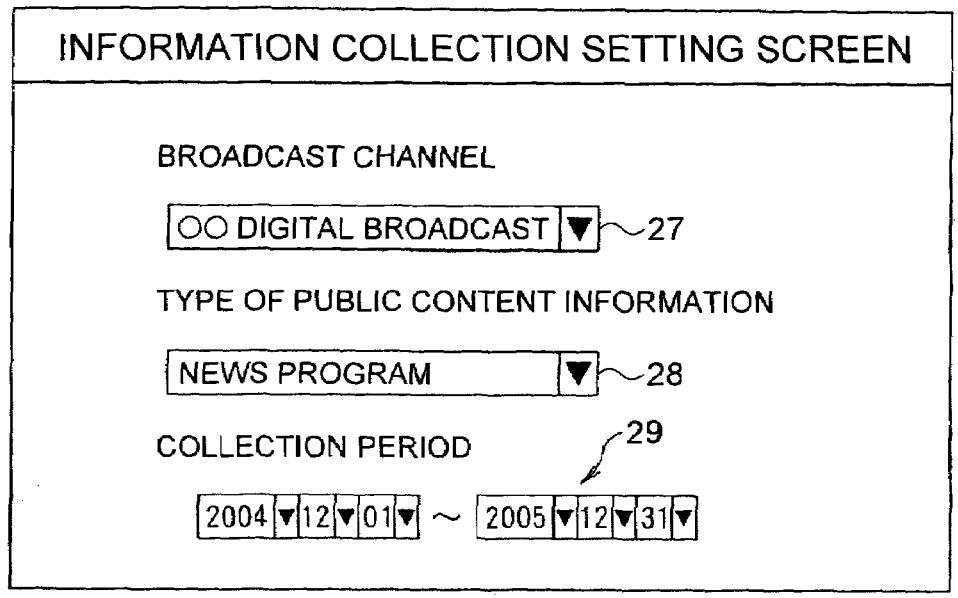
FIG. 4 is a diagram for explaining an information collection setting screen that is displayed on a display in the public content information collection processing.

In the content information collection processing, as described in FIG. 3, first, in step S0, the central processing unit 1 displays an information collection setting screen for setting public content information to be collected. As shown in FIG. 4, the information collection setting screen includes a broadcast channel setting section 27 in which a broadcast channel is set, a type selecting section 28 in which a type of public content information such as a news program, a music program, or a drama is set, and a collection period setting section 29 in which a collection period is set.

When the respective setting sections 27 to 29 are set on the information collection setting screen, the central processing unit 1 shifts to step S1 and acquires program information of a digital broadcast channel set. The central processing unit 1 shifts to step S2 and extracts time frames in which programs set are broadcasted from the program information acquired. Then, the central processing unit 1 shifts to step S3.

In step S3, the central processing unit 1 judges whether a broadcast start time for the set program extracted has come. When the broadcast start time for the set program has not come, the central processing unit 1 waits until the broadcast start time comes. When the broadcast start time has come, the central processing unit 1 shifts to step S4 and stores metadata incidental to the set program in, for example, a public-content-information storing area formed in a hard disk device 5 together with a recording date and time. Then, the central processing unit 1 shifts to step S5.

In step S5, the central processing unit 1 judges whether a broadcast time for the set program has ended. When the broadcast time has not ended, the central processing unit 1 returns to step S4. When the broadcast time has ended, the central processing unit 1 shifts to step S6 and judges whether collection of metadata in all set programs extracted in step S2 has been completed. When set programs for which metadata has not been collected are present, the central processing unit 1 shifts to step S7 and designates the next set program. Then, the central processing unit 1 returns to step S3. When the collection of metadata in all the set programs has ended, the central processing unit 1 shifts to step S8 and judges whether information collection should be continued according to, for example, whether it is within a collection period set in the collection period setting section 29. When it is within the collection period, the central processing unit 1 judges that the information collection should be continued and returns to step S1. When the collection period ends, the central processing unit 1 ends the information collection processing.

The private content information reading processing is executed when the digital camera 13 is connected to the digital camera connection interface 14. As shown in FIG. 5, first, in step S1, the central processing unit 1 accesses a memory card, in which photographed image data and metadata thereof are stored in association with each other, incorporated in the digital camera 13 and sequentially reads the image data and the metadata stored in the memory card.

Figure 6:
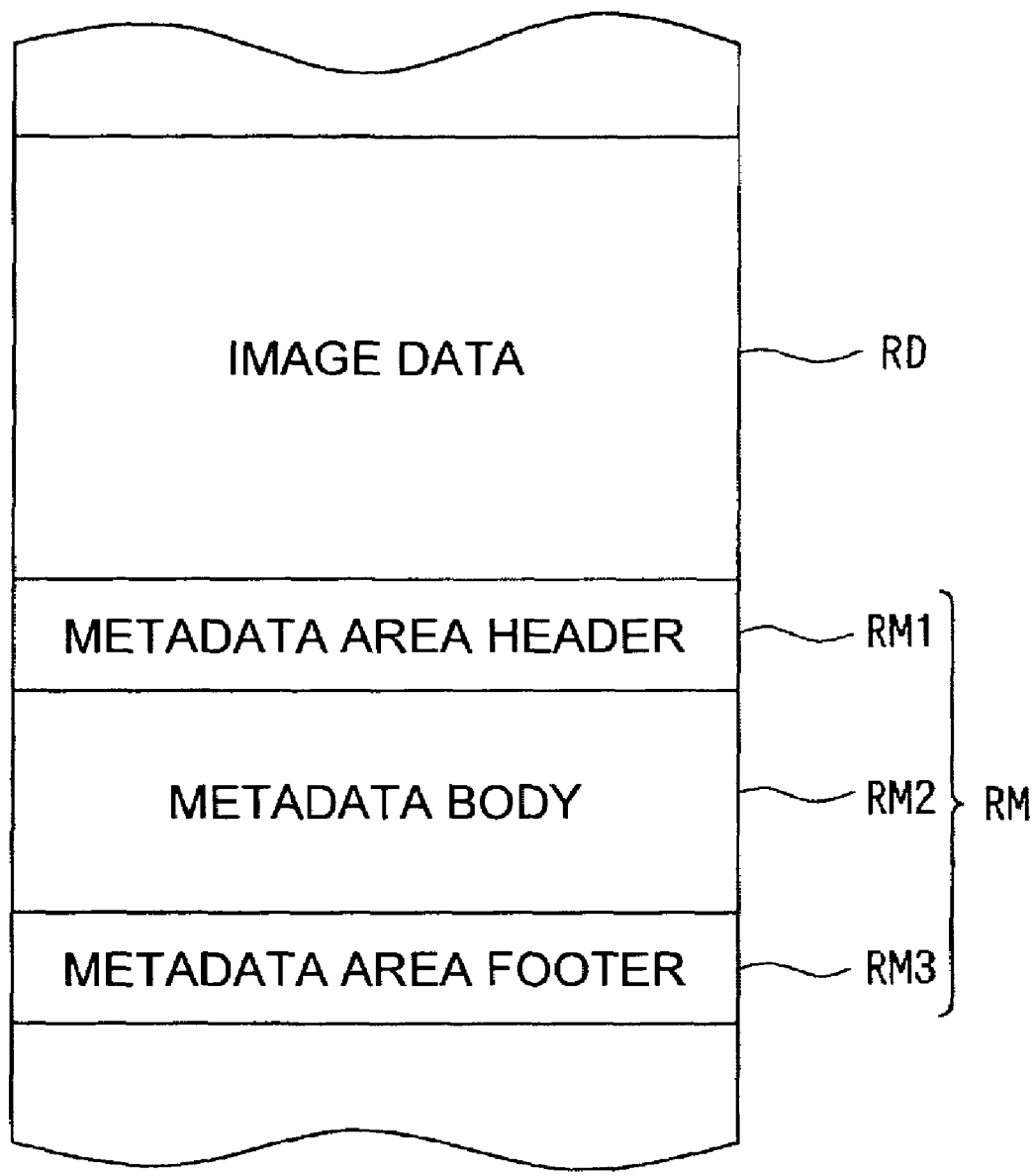
FIG. 6 is a diagram for explaining a storage area of a memory card of a digital camera.

As shown in FIG. 6, the image data stored in the card memory is stored in a form in which a data recording area RD for data in, for example, a JPEG compression format obtained by compressing image data of binary data photographed by the digital camera 13 and a photographing metadata storing area RM, in which metadata described in XML (Extensible Markup Language) data is recorded, following the data recording area RD are connected. The metadata recorded in the photographing metadata storing area RM is constituted by a metadata area header RM1, a metadata body RM2, and a metadata area footer RM3. In the metadata area header RM1 and the metadata area footer RM3, in order to correctly recognize whether the metadata is connected to the image data, identification information and size information of the photographing metadata storing area RM are recorded. In the metadata body RM2, photographing information or the like such as date and time information, shutter speed, and a stop in photographed image information is recorded in an XML file format.

It is possible to register the metadata without affecting other applications by forming the metadata recording area RM after the image data storing area RD in this way. In other words, since information in a header part of the image data does not change before the metadata is connected, it is possible to reproduce the image data with a general browser.

Subsequently, the central processing unit 1 shifts to step S12, displays the image data read on the display 7, and performs selection processing for selecting image data that a user wishes to read. The central processing unit 1 shifts to step S13 and judges whether image data selected in the selection processing is present. When the selected image data is not present, the central processing unit 1 ends the reading processing. When the selected image data is present, the central processing unit 1 shifts to step S14. The central processing unit 1 stores the selected image data and metadata incidental to the image data in an image data storing area serving as a private content information storing area designated in the hard disk device 5. Then, the central processing unit 1 ends the image data reading processing.

The metadata generation processing is executed when the metadata generation processing is selected on a predetermined menu screen. As shown in FIG. 7, first, in step S21, the central processing unit 1 performs image data selection processing for reading image data, to which metadata for retrieval for facilitating retrieval of image data is added, from the image data storing area of the hard disk device 5, and displays the image data on the display 7. Subsequently, the central processing unit 1 shifts to step S22 and judges whether the image data, to which the metadata for retrieval is added, is selected in the image data selection processing. When the image data is not selected, the central processing unit 1 shifts to step S23 and judges whether processing end is instructed according to selection or the like of a processing end button for ending the metadata generation processing. When the processing end is instructed, the central processing unit 1 ends the metadata generation processing directly. When the processing end is not instructed, the central processing unit 1 returns to step S21.

On the other hand, when a result of the judgment in step S22 indicates that the selected image data is present, the central processing unit 1 shifts to step S24 and reads photographing metadata added to the selected image data. Subsequently, the central processing unit 1 shifts to step S25 and extracts public content information at a date and time close to a photographing date and time described in the metadata read in step S24 from public content information stored in the public-content-information storing area of the hard disk device 5. The central processing unit 1 shifts to step S26 and judges whether the public content information extracted is present. When the extracted public content information is not present, the central processing unit 1 shifts to step S27 and displays guidance information, which indicates that the corresponding public content information is not present, on the display 7. Then, the central processing unit 1 shifts to step S47 described later. When the extracted public content information is present, the central processing unit 1 shifts to step S28.

In step S28, the central processing unit 1 reads metadata of a first one piece of the extracted public content information. Subsequently, the central processing unit 1 shifts to step S29 and analyzes the metadata to extract text data described as the metadata. The central processing unit 1 shifts to step S30 and judges whether the text data extracted is formed of a single word. When the text data is formed of a single word, the central processing unit 1 shifts to step S31 and sets the single word as a keyword. Then, the central processing unit 1 jumps to step S34.

When a result of the judgment in step S30 indicates that the text data is not formed of a single word, the central processing unit 1 shifts to step S32 and subjects the text data to morphological analysis to extract a word of a proper noun. Subsequently, the central processing unit 1 shifts to step S33 and sets the word extracted as a keyword. Then, the central processing unit 1 shifts to step S34.

In step S34, the central processing unit 1 extracts a keyword coinciding with a keyword stored in a keyword storing unit set in advance in the hard disk device 5. Subsequently, the central processing unit 1 shifts to step S35 and judges whether the coinciding keyword is extracted. When the coinciding keyword is extracted, the central processing unit 1 jumps to step S39 described later. When the coinciding keyword is not extracted, the central processing unit 1 shifts to step S36 and displays, on the display 7, a selection screen for selecting whether the keyword extracted from the text data is adopted. The central processing unit 1 shifts to step S37 and judges whether the adoption of the keyword is selected. When the adoption of the keyword is not selected, the central processing unit 1 jumps to step S40 described later. When the adoption of the keyword is selected, the central processing unit 1 shifts to step S38 and adds the adopted keyword to the keyword storing unit. Then, the central processing unit 1 shifts to step S39.

In step S39, the central processing unit 1 temporarily stores the extracted keyword in the RAM 4 as a retrieval keyword. Subsequently, the central processing unit 1 shifts to step S40 and judges whether public content information, for which the keyword extraction processing is not completed, is present. When public content information, for which the keyword extraction processing is not completed, is present, the central processing unit 1 shifts to step S41 and reads metadata of the next public content information. Then, the central processing unit 1 returns to step S29. When the keyword extraction processing is completed for all the pieces of extracted public content information, the central processing unit 1 shifts to step S42.

In step S42, the central processing unit 1 selects a keyword with a high appearance frequency from keywords stored in the RAM 4. Subsequently, the central processing unit 1 shifts to step S43 and displays, on the display 7, a selection screen for selecting whether the keyword selected is adopted as a keyword for retrieval. The central processing unit 1 shifts to step S44 and judges whether the keyword is selected as a keyword for retrieval. When the keyword is not selected as a keyword for retrieval, the central processing unit 1 jumps to step S47 described later. When the keyword is selected as a keyword for retrieval, the central processing unit 1 shifts to step S45 and converts the keyword for retrieval into metadata for retrieval. The central processing unit 1 shifts to step S46 and adds the metadata for retrieval to the photographing metadata storing area RM of image data corresponding to the metadata for retrieval. In addition, the central processing unit 1 changes the metadata area header RM1 and the metadata area footer RM3. Then, the central processing unit 1 shifts to step S47.

In step S47, the central processing unit 1 judges whether another piece of private content information is selected. When another piece of private content information is selected, the central processing unit 1 returns to step S21. When another piece of private content information is not selected, the central processing unit 1 ends the metadata generation processing.

Note that the processing in FIG. 3 corresponds to the public-content-information collecting means. The processing in steps S21 to S41 in the processing in FIG. 7 corresponds to the keyword extracting means. The processing in steps S28 and S29 corresponds to the metadata analyzing means. The processing in step S32 corresponds to the morphological analysis means. The processing in steps S35 to S38 corresponds to the keyword storing means. The processing in steps S42 to S46 corresponds to the metadata generating means.

Operations in the first embodiment are explained below.

First, a user starts the information processing apparatus PC and stores a large number of pieces of private content information, which include image data photographed by the user using the digital camera 13 and metadata, collectively in the hard disk device 5 in an arbitrary format such as an album format. In this case, the central processing unit 1 executes content information collection processing for collecting public content information for generating metadata for retrieval that facilitates retrieval of photographing data.

The content information collection processing is, as described above, processing for collecting a keyword for facilitating retrieval of private content information. For example, when the user designates an icon for starting execution of the content information collection processing and clicks the icon, the information collection processing in FIG. 3 is started. In the information collection processing, first, the information collection setting screen shown in FIG. 4 is displayed (step S0). The user sets a broadcast channel of a digital broadcast in the broadcast channel setting section 27 for public content information collected on the information collection setting screen. The user sets a type of the public content information, for example, a news program in the public-content-information-type setting section 28. The user sets a period in which the public content information is collected in the collection period setting section 29. Thereafter, the user clicks a not-shown execution button with the mouse 9, whereby the central processing unit 1 shifts to step S1.

In step S1, the central processing unit 1 acquires program information of a designated digital broadcast channel and extracts time frames of news programs from the program information acquired (step S2).

The central processing unit 1 waits until a start time for a first news program comes. When the start time for the news program comes (step S3), the central processing unit 1 stores, in the public-content-information storing area formed in the hard disk device 5, metadata describing news contents such as content describing metadata, which describes news contents, and instance describing metadata, which describes a specific instance of a content, among various metadata incidental to the news program (step S4).

When the news program ends, the central processing unit 1 judges whether collection of metadata from all the news programs set is completed (step S5). When there are remaining news programs, the central processing unit 1 designates the next news program in a closest time frame among the remaining news programs (step S7). The central processing unit 1 returns to step S3.

When the central processing unit 1 completes the information collection processing for metadata of all the news programs described in the acquired program information (step S6), the central processing unit 1 judges whether information collection in the designated period has ended. When the set period has not expired and the information collection is continued, the central processing unit 1 returns to step S1. When the set period expires, the central processing unit 1 ends the information collection processing.

By repeating the information collection processing during the set period in this way, it is possible to sequentially collect various metadata describing important news reported in a news program and events matching seasons such as cherry-blossom viewing, firework displays, swimming in the ocean, and the like in association with date and times of the important news and the events. The metadata are stored in the public-content-information storing area of the hard disk device 5.

In a state in which metadata of news programs are sequentially stored in the public-content-information storing area of the hard disk device 5 together with date and times of the news programs in this way, the user photographs, for example, pictures of scenes of a firework display and people in the firework display with the digital camera 13. The user stores private content information, which includes bitmap image data of the pictures and photographing metadata such as a photographing date and time and photographing data, in the memory card of the digital camera 13.

Thereafter, the user brings the digital camera 13 back home, connects the digital camera 13 to the digital camera connection interface 14 directly or pulls out the memory card from the digital camera 13, and inserts the memory card in the memory card reader 15 connected to the memory card interface 16. In this state, the central processing unit 1 executes the private content information reading processing described in FIG. 5.

Consequently, the central processing unit 1 accesses the memory card and reads the respective pieces of private content information stored in the memory card (step S11). The central processing unit 1 displays, on the display 7, the respective pieces of private content information read and performs image data selection processing for selecting necessary private content information (step S12). The central processing unit 1 stores the private content information including image data and photographing metadata, which is selected in the image data selection processing, in an image data storing area serving as a designated private content information storing area in the hard disk device 5 (step S14).

At a point when the storage of the private content information in the hard disk device 5 is completed or after the completion of the storage, to add metadata for retrieval for facilitating retrieval to the private content information stored, for example, the user clicks an icon displayed on the display 7 to cause the central processing unit 1 to execute the metadata generation processing described in FIG. 7.

In the metadata generation processing, first, the central processing unit 1 executes selection processing for selecting private content information to which metadata for retrieval is added. In the selection processing, the central processing unit 1 displays the private content information stored in the private content information storing area of the hard disk device 5 on the display 7. The user selects desired private content information from the private content information displayed. In this case, one image data may be selected as the private content information. It is also possible that plural image data are grouped and the private content information is selected by a unit of a group.

When the selection of private content information is not performed, the central processing unit 1 judges whether a processing end instruction is inputted, for example, a processing end button is clicked with a mouse. When a processing end instruction is inputted, the central processing unit 1 ends the metadata generation processing directly. However, when a processing end instruction is not inputted, the central processing unit 1 returns to step S21 and continues the private content information selection processing.

In the private content information selection processing, when one arbitrary piece of private content information is selected or arbitrary private content information is selected by a unit of a group, the central processing unit 1 shifts from step S22 to step S24. The central processing unit 1 reads photographing metadata added to object private content information and accesses the public-content-information storing area formed in the hard disk device 5 to extract public content information at a date and time close to a photographing date and time described in the photographing metadata (step S25).

The central processing unit 1 judges whether the corresponding public content information is extracted. When the corresponding public content information is not extracted, the central processing unit 1 displays guidance information, which indicates that the corresponding public content information is not present, on the display 7. Then, the central processing unit 1 shifts to step S47 and judges whether the user selects another piece of private content information. When the user selects another piece of private content information, the central processing unit 1 returns to step S21. When the user does not select another piece of private content information, the central processing unit 1 ends the metadata generation processing.

On the other hand, when a result of the judgment in step S26 indicates that the corresponding public content information is present, the central processing unit 1 reads metadata of a first one piece of the public content information (step S28).

In this case, it is assumed that, as shown in FIG. 8, the metadata of the public content information is metadata of a news program, "Firework display in summer 2004" is set as a "Title" and "In a firework display, large fireworks were set off on the Sumida River. Spectators cheered." is described as "Synopsis". On the other hand, it is assumed that, as shown in FIG. 9, "firework, athletic meet, exhibition, concert, the Tone River, the Sumida River, the Kiso River", and the like are stored as keywords in the keyword storing unit of the hard disk device 5.

When the central processing unit 1 analyzes the metadata to extract text data in this state, the sentence "In a firework display, large fireworks were set off on the Sumida River. Spectators cheered." is extracted. Since this is not a single word, the central processing unit 1 shifts from step S30 to step S32 and subjects the sentence to morphological analysis to extract words of proper nouns "firework display", "the Sumida River", "firework", "spectators", and "cheered" as keywords.

When the central processing unit 1 extracts keywords, which coincide with the keywords stored in the keyword storing area, among the words extracted, "firework display" and "the Sumida River" coincide with the keywords stored in the keyword storing area. The keywords are temporarily stored in a predetermined storing area of the RAM 4 as keywords for retrieval.

Subsequently, when there is public content information not subjected to the keyword extraction processing, that is, another news program, the central processing unit 1 applies the analysis processing in steps S29 to S39 to the news program. When it is assumed that news of "firework displays" in different locations are reported, an appearance frequency of "firework display" increases. Thus, the central processing unit 1 selects the "firework display" as a keyword (step S42).

The central processing unit 1 displays, on the display 7, a selection screen for selecting whether the keyword selected "firework display" is adopted as a keyword for retrieval (step S43). When the keyword "firework display" is selected as a keyword for retrieval, the central processing unit 1 converts the keyword "firework display" into metadata (step S45). The central processing unit 1 adds the metadata to the photographing metadata storing area RM of corresponding private content information and changes the metadata area header and the metadata area footer (step S46). Subsequently, the central processing unit 1 shifts to step S47. As shown in FIG. 10, metadata for retrieval in this case is "firework display" stored as, for example, "DrivedKeyword".

In step S47, the central processing unit 1 judges whether another piece of private content information is selected. When another piece of private content information is selected, the central processing unit 1 returns to step S21. When another piece of private content information is not selected, the central processing unit 1 ends the metadata generation processing.

Incidentally, when the keyword extracted from the text data in step S34 does not coincide with the keyword stored in the keyword storing unit, the central processing unit 1 shifts from step S35 to step S36 and displays, on the display 7, a selection screen for selecting whether the keyword extracted from the text data is adopted. When the keyword extracted from the text data is adopted, the central processing unit 1 shifts from step S37 to step S38 and adds the keyword adopted in the keyword storing unit as a new keyword. Then, the central processing unit 1 shifts to step S39 and temporarily stores the keyword in the RAM 4 as a keyword for retrieval.

Therefore, when a new keyword is also extracted in another news program and an appearance frequency of the keyword is high, the new keyword is adopted as a keyword for retrieval. When the keyword is selected, the keyword is converted into metadata and added to the photographing metadata storing area RM of the corresponding private content information.

In this way, the metadata for retrieval is automatically added to the private content information stored in the hard disk device 5. Therefore, in retrieving private content information in the future, when the user cannot recall a date and time of the private content information accurately, the user can retrieve corresponding private content information accurately by inputting a keyword for retrieval, for example, "firework display" in the case described above to retrieve the private content information. In this case, a content of the private content information and a content of a keyword described in the metadata for retrieval do not have to coincide with each other. When the user wishes to retrieve private content information photographed around time of a firework display, since metadata for retrieval describing "firework display" is added to private content data before and after the wirework display, it is possible to accurately retrieve private content information temporally related to the private content information with "firework display" as a keyword.

In this way, according to the first embodiment, public content information is collected in a desired collection period and metadata for retrieval is generated from metadata included in the public content information. Thus, the user can generate metadata for retrieval without directly inputting metadata for retrieval. The user can generate metadata for retrieval easily without performing complicated operation. Even a user unaccustomed to operation can easily add metadata for retrieval to private content information.

Moreover, it is possible to limit public content information for which metadata for retrieval is created. Thus, it is possible to extract a keyword optimum for an individual user and set a keyword optimum as a keyword in retrieving private content information later.

Furthermore, a keyword extracted from the public content information, which coincides with a keyword stored in the keyword storing unit, is set as a keyword for retrieval. Thus, a larger number of keywords are never set as keywords for retrieval carelessly. Only a keyword required by the user is set as metadata for retrieval. This makes it possible to limit the overall number of metadata for retrieval.

Figure 11:
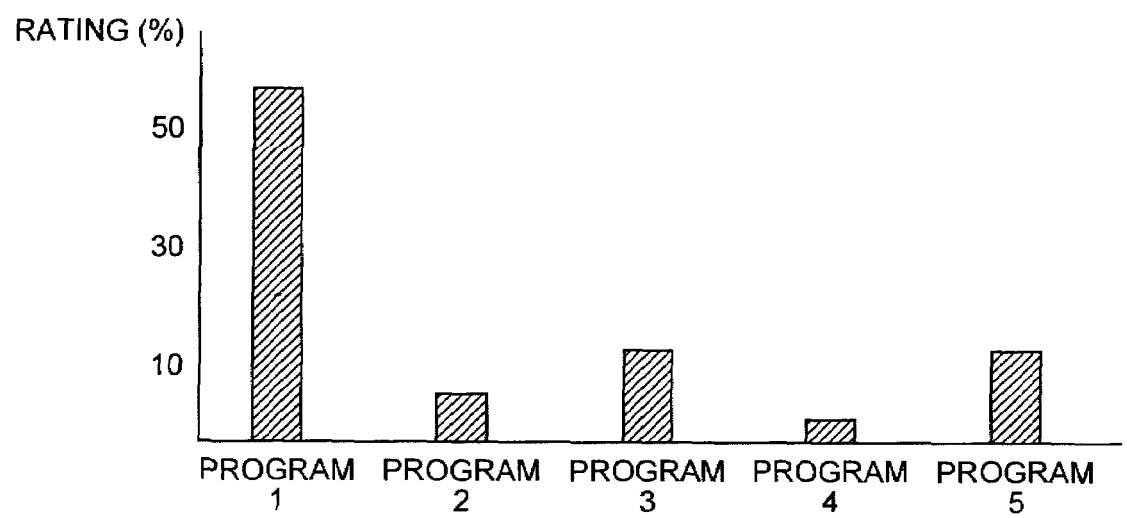
FIG. 11 is a diagram for explaining program rating data.

Note that, in the explanation of the first embodiment, a news program of a digital broadcast is selected as public content information. However, the invention is not limited to this. For example, when it is possible to access rating data of a digital broadcast or an analog broadcast as shown in FIG. 11, a program with high rating, which is a specific possible program such as a serial drama, may be extracted to generate a program name of the program extracted as metadata for retrieval. In this case, the program with high rating itself is often talked about socially and often remains in memories of viewers. Therefore, it is possible to set an optimum keyword by adopting a program name or the like as metadata for retrieval. Similarly, although not a serial like a drama, a nationwide topic or a worldwide topic, which is reported in report programs, variety shows, and the like on plural channels, rather than one channel, may be adopted as metadata for retrieval.

In the explanation of the first embodiment, a keyword is set as a keyword for retrieval on the basis of an appearance frequency of the keyword. However, the invention is not limited to this. It is also possible that an extracted keyword is displayed on a display and a user sets a keyword for retrieval to be adopted by selecting the keyword with the keyboard 8, the mouse 9, or the like.

Moreover, in the explanation of the first embodiment, public content information, private content information, and metadata for retrieval are stored in the hard disk device 5. However, the invention is not limited to this. Private content information added with metadata for retrieval may be stored in a DVD by the DVD drive device 6. Other arbitrary storages may be applied.

A second embodiment of the invention will be explained with reference to FIGS. 12 and 13.

In the second embodiment, instead of automatically generating metadata of private content information using metadata incidental to program information of a digital broadcast, metadata is automatically generated on the basis of sound information of a digital broadcast, an analog broadcast, or a radio broadcast.

Figure 12:
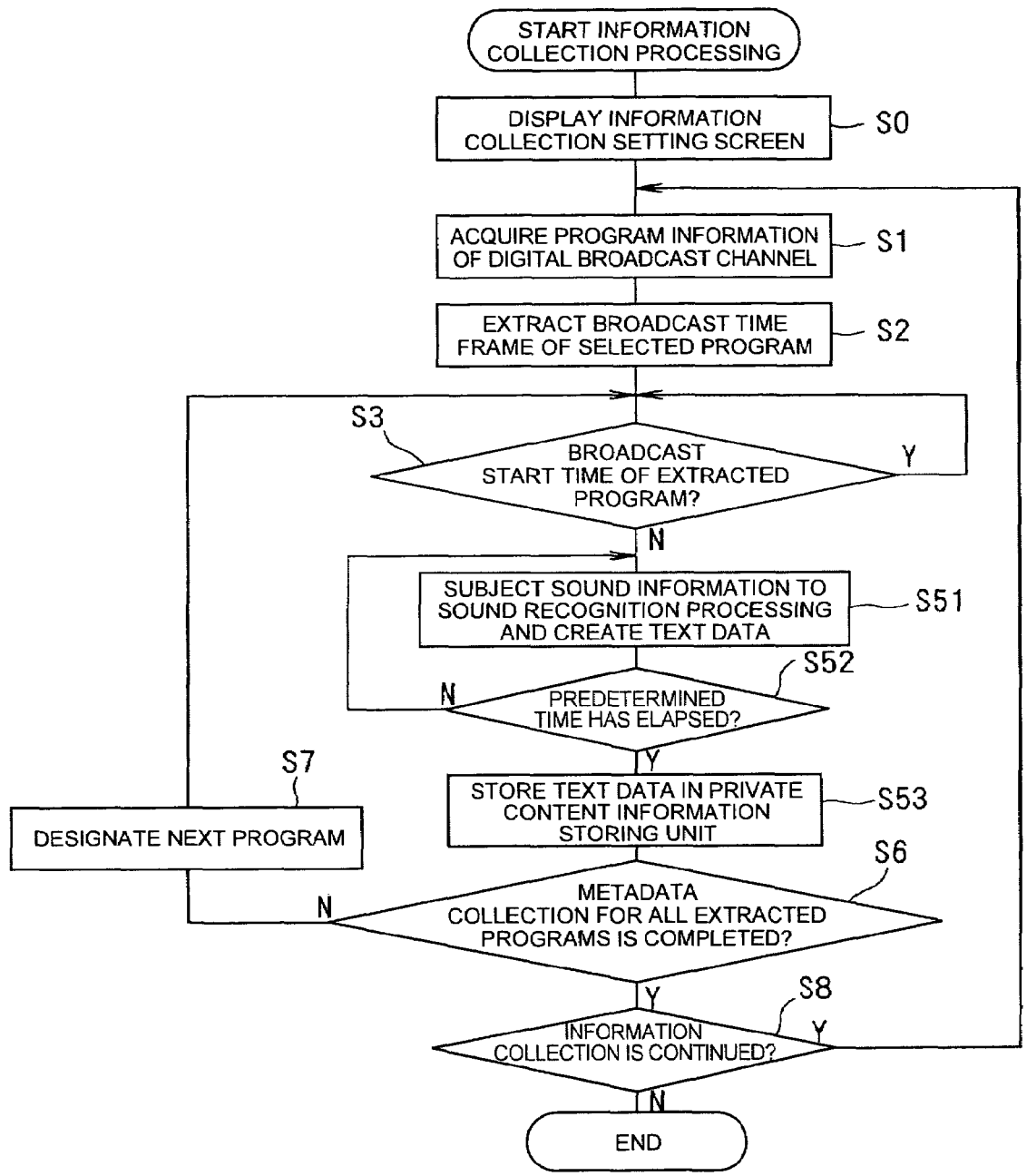
FIG. 12 is a flowchart showing an example of a procedure for public content information collection processing in a second embodiment of the invention.

In the second embodiment, the central processing unit 1 executes content information collection processing shown in FIG. 12. In the content information collection processing, the processing in steps S4 and S5 in the content information collection processing described in FIG. 3 in the first embodiment is not performed. Instead of steps S4 and S5, when it is judged in step S3 that the broadcast start time for the extracted news program has come, the central processing unit 1 shifts to step S51. In step S51, the central processing unit 1 executes sound recognition processing for subjecting sound information of the news program to sound recognition to create text data. Subsequently, the central processing unit 1 judges whether a predetermined time for introducing outlines of important news (e.g., about three minutes; when a commercial is inserted, about three minutes after actual news is provided) has elapsed after a news program is started. When the predetermined time has not elapsed, the central processing unit 1 returns to step S51. When the predetermined time has elapsed, the central processing unit 1 shifts to step S53 and stores the text data created in the content information storing unit. Then, the central processing unit 1 shifts to step S6. Therefore, the central processing unit 1 performs the same processing as the content information collection processing in FIG. 3 except that the processing in steps S4 and S5 is not performed and steps S51 to S53 are added. The steps in FIG. 12 corresponding to the steps in FIG. 3 are denoted by the identical step numbers. Detailed explanations of the steps are omitted. The sound recognition processing is performed in steps of frequency analysis, phoneme recognition, word recognition, and sentence recognition.

Figure 13:
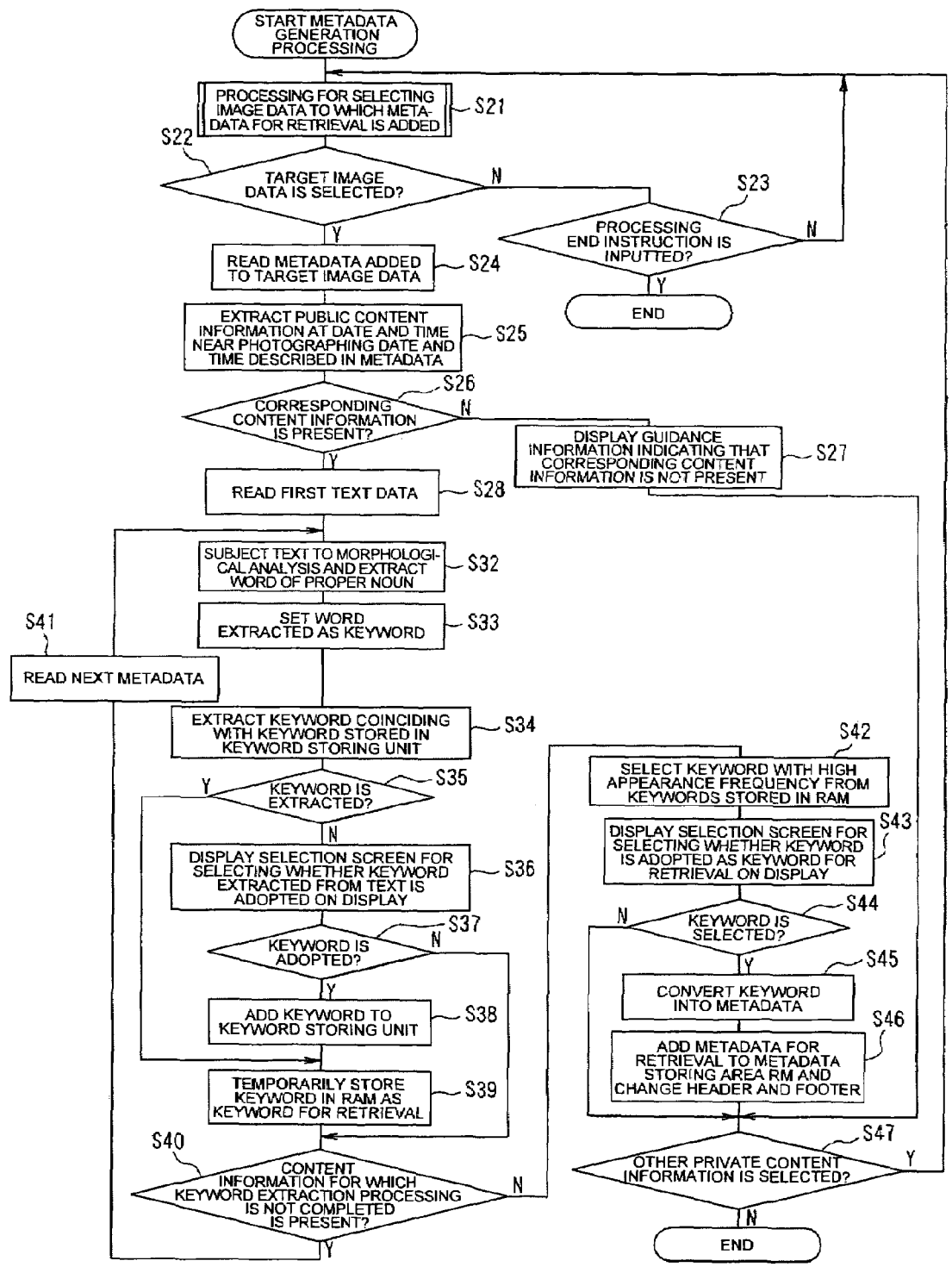
FIG. 13 is a flowchart showing an example of a procedure for metadata generation processing in the second embodiment of the invention.

As shown in FIG. 13, in the metadata generation processing executed by the central processing unit 1, the processing in step S28 in the metadata generation processing described in FIG. 7 in the first embodiment is changed from the processing for reading first metadata to processing for reading first text data. The processing in step S29 for analyzing metadata to extract a text, the processing in step S30 for judging whether the text is formed of a single word, and the processing in step S31 for setting the word as a keyword in the metadata generation processing in FIG. 7 are not performed. The processing in step S41 in the metadata generation processing in FIG. 7 is changed from the processing for reading metadata of the next content information to processing for reading text data of the next content information. Therefore, the central processing unit 1 performs the same processing as the metadata generation processing in FIG. 7 except that the processing in step S28 is changed, the processing in steps S29 to S31 is not performed, and the processing in step S41 is changed. The steps in FIG. 13 corresponding to the steps in FIG. 7 are denoted by the identical step numbers. Detailed explanations of the steps are omitted.

Note that the processing in FIG. 12 corresponds to the public-content-information collecting means. Processing in step S51 in the processing in FIG. 12 corresponds to the sound recognizing means. The processing in steps S21 to S29 and steps S32 to S41 in FIG. 13 corresponds to the keyword extracting means. The processing in step S32 corresponds to the morphological analysis means. The processing in steps S42 to S46 in the processing in FIG. 13 corresponds to the metadata generating means.

According to the second embodiment, instead of collecting metadata incidental to a news program in the first embodiment, the central processing unit 1 subjects an outline of important news at the beginning of a news program to sound recognition processing to create text data (step S51) and stores the text data created in the content information storing unit. Thus, although an amount of information stored in the content information storing unit increases, it is possible to extract important news.

In the metadata generation processing in FIG. 13, the central processing unit 1 performs morphological analysis to extract plural keywords consisting of proper nouns on the basis of the text data stored in the content information storing unit. The central processing unit 1 compares the plural keywords extracted with keywords stored in the keyword storing unit, selects keywords coinciding with the keywords stored in the keyword storing unit, and temporarily stores the keywords selected in the RAM 4. The central processing unit 1 sets a keyword with a high appearance frequency among keywords, which are selected from respective news programs near a photographing date and time of private content information, as a keyword for retrieval. The central processing unit 1 displays the keyword for retrieval on the display 7 and, when the user confirms the keyword for retrieval, converts the keyword for retrieval into metadata for retrieval. The central processing unit 1 adds the metadata for retrieval to the photographing metadata storing area RM following the image data storing area RD of the private content information and changes the metadata area header and the metadata area footer.

Therefore, as in the first embodiment, it is possible to automatically generate metadata for retrieval of private content information from a sound signal of a news program. It is possible to prevent complicated operation of a user to reduce burdens on the user significantly. Thus, even a user unaccustomed to operation can easily add metadata for retrieval to private content information.

Note that, in the explanation of the second embodiment, text data is created by the sound recognition processing in the collection processing for public content information described in FIG. 12. However, the invention is not limited to this. In the metadata generation processing described in FIG. 13, the central processing unit 1 may read sound information in step S28, shift to step S32, and perform the sound recognition processing to extract a word. As the sound recognition processing in this case, the central processing unit 1 may perform frequency analysis, phoneme recognition, word recognition, and sentence recognition to form text data as described above. However, it is preferable to perform word HMM (Hidden Markov Model) after performing frequency analysis and phoneme recognition and extract a word directly.

In the explanation of the second embodiment, metadata for retrieval is generated on the basis of a sound signal at the time when a digital broadcast radio wave is received. However, the invention is not limited to this. It is possible to receive an analog broadcast radio wave and generate metadata for retrieval from a sound signal of a news program on the analog broadcast radio wave or from metadata for retrieval from a sound signal of a news program in a radio broadcast.

In the explanations of the first and the second embodiments, when a keyword for retrieval is selected, the keyword for retrieval is displayed on the display 7 and a user judges whether the keyword for retrieval should be adopted. However, the invention is not limited to this. It is also possible that, when a keyword for retrieval is selected, the user does not judge whether the keyword for retrieval should be adopted and the keyword for retrieval is converted into metadata for retrieval and added to photographing metadata of private content information.

In the explanations of the first and the second embodiments, an appearance frequency is set as a degree of appropriateness of a keyword for retrieval. However, the invention is not limited to this. It is also possible that priorities are attached to keywords and a keyword with a high priority is selected as a keyword for retrieval.

In the explanations in the first and the second embodiments, generated metadata for retrieval is added to photographing metadata of private content information. However, the invention is not limited to this. The generated metadata may be stored in a metadata-for-retrieval storing area formed in the hard disk device 5 in association with the private content information.

Figure 14:
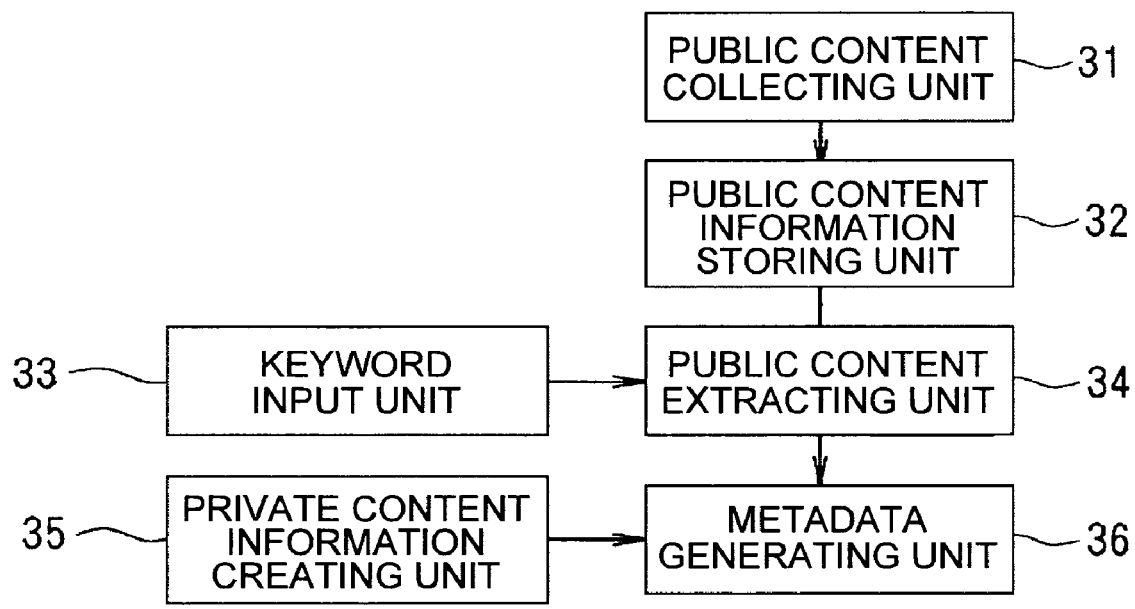
FIG. 14 is another functional block diagram of the central processing apparatus.

In the explanations of the first and the second embodiments, public content information is collected and metadata of public content information corresponding to a date and time of private content information is extracted from the public content information. However, the invention is not limited to this. As shown in a block diagram in FIG. 14, the information processing apparatus may include a public content collecting unit 31, a public content storing unit 32, a keyword input unit 33, a public content extracting unit 34, and a metadata generating unit 36. The public content collecting unit 31 executes the content information collection processing described in FIG. 3. The public content storing unit 32 stores public content information collected by the public content collecting unit 31. The keyword input unit 33 serves as keyword input means such as the keyboard 8 that inputs a keyword for retrieval. The public content extracting unit 34 serves as public content information extracting means that extracts public content information, which includes metadata describing a keyword identical with the keyword inputted by the keyword input unit 33, from the public content information stored in the public content storing unit 32. The metadata generating unit 36 serves as metadata generating means that stores metadata of the public content information, which is extracted by the public content extracting unit 34, in a hard disk device or the like as metadata for retrieval in association with private content information stored in a private-content-information storing unit 35.

In the explanations of the first and the second embodiments, the digital broadcast receiving unit 11 receives a digital or analog broadcast radio wave. However, the invention is not limited to this. Broadcast information delivered by a CATV or the like using an optical fiber or the like, broadcast information delivered via a network such as the Internet, a video provided by video-on-demand, and the like may be collected. Further, newspaper data delivered via the network such as the Internet, newspaper information and magazine information in a year stored in a storage medium such as a DVD or a CD, and the like may be collected as public content information.

In the explanations of the first and the second embodiments, the digital camera 13 is applied as the private-content-information creating means. However, the invention is not limited to this. It is also possible to apply a digital video camera for photographing moving image data or apply arbitrary private-content-information creating means as the private-content-information creating means.

Moreover, in the explanations of the first and the second embodiments, one information processing apparatus PC performs the public content information collection processing and the metadata generation processing. However, the invention is not limited to this. It is also possible that an information processing apparatus performs the public content information collection processing and another information processing apparatus performs the private content information reading processing and the metadata generation processing, and both the information processing apparatuses are connected via a network to cooperate with each other. Further, a digital broadcast receiving apparatus may perform the public content information collection processing, the private content information reading processing, and the metadata generation processing.

The entire disclosure of Japanese Patent Application No. 2004-354991, filed Dec. 8, 2004 is expressly incorporated by reference herein.

What is claimed is:

1. A metadata generating apparatus having a processor and a hard disk device, the apparatus comprising:

a private-content-information creating unit that creates content information of an individual;

an information collection setting unit that collects setting information for collection of public content information from a public broadcast, the information collection setting unit including a collection period setting section in which a collection period for the collection of public content information from the public broadcast is set and a type selecting section in which a type of public content information for the collection of public content information from the public broadcast is set, the public broadcast including a news program;

a public-content-information collecting unit that collects public content information for which metadata for retrieval is created from the public broadcast based on the collection period set in the collection period setting section and the type of public content information set in the type selecting section, the public-content-information collecting unit executing sound recognition processing of the news program, including a frequency analysis, a phoneme recognition, a word recognition, and a sentence recognition of the news program, to generate text data of the news program, the sound recognition processing being performed for a predetermined period at a beginning of the news program, said predetermined period corresponding to an introduction period of the news program before insertion of a commercial;

a keyword extracting unit that extracts a keyword, which forms a basis of the metadata for retrieval, from the public content information, including the text data of the news program, collected by the public-content-information collecting unit; and a metadata generating unit that generates metadata with the processor and stores the metadata in the hard disk device for retrieval for a private content, which is created by the private-content-information creating unit, on the basis of the keyword extracted by the keyword extracting unit and the public content information, including the text data of the news program, collected by the public-content-information collecting unit.

2. A metadata generating apparatus according to claim 1, wherein the public-content-information collecting unit collects public content information including metadata, and the keyword extracting unit includes:

a metadata analyzing unit that analyzes metadata included in the public content information collected by the public-content-information collecting unit; and a morphological analysis unit that subjects the public content information to morphological analysis on the basis of a result of the analysis of the metadata analyzing unit to extract a keyword.

3. A metadata generating apparatus according to claim 1, wherein the keyword extracting unit has a keyword storing unit that stores a keyword for which metadata for retrieval is generated, and the keyword extracting unit selects a keyword, which coincides with the keyword stored in the keyword storing unit, among keywords extracted from the public content information as an object keyword.

4. A metadata generating apparatus according to claim 3, wherein the keyword storing unit stores the keyword extracted from the public content information.

5. A metadata generating apparatus according to claim 1, wherein the metadata generating unit selects a keyword for retrieval on the basis of a predetermined degree of appropriateness from keywords extracted by the keyword extracting unit and generates metadata for retrieval on the basis of the keyword for retrieval selected.

6. A metadata generating apparatus according to claim 1, wherein the metadata generating unit sets a high appearance frequency as the predetermined degree of appropriateness and selects a keyword with a high appearance frequency as a keyword for retrieval.

7. A metadata generating apparatus having a processor and a hard disk device, the apparatus comprising:

a private-content-information creating unit that creates content information of an individual;

an information collection setting unit that collects setting information for collection of public content information from a public broadcast, the information collection setting unit including a collection period setting section in which a collection period for the collection of public content information from the public broadcast is set and a type selecting section in which a type of public content information for the collection of public content information from the public broadcast is set, the public broadcast including a news program;

a public-content-information collecting unit that collects public content information including metadata for which metadata for retrieval is created from the public broadcast based on the collection period set in the collection period setting section and the type of public content information set in the type selecting section, the public-content-information collecting unit executing sound recognition processing of the news program, including a frequency analysis, a phoneme recognition, a word recognition, and a sentence recognition of the news program, to generate text data of the news program, the sound recognition processing being performed for a predetermined period at a beginning of the news program, said predetermined period corresponding to an introduction period of the news program before insertion of a commercial;

a keyword input unit that inputs a keyword;

a public-content-information extracting unit that extracts public content information from the public broadcast, including the text data of the news program, including metadata describing a keyword coinciding with the keyword inputted by the keyword input unit; and a metadata generating unit that generates the metadata with the processor, which is included in the public content information, including the text data of the news program, extracted by the public-content-information collecting unit, as metadata for storage in the hard disk device and retrieval for private content information.

* * * * *